Nov. 25, 1941.  M. C. HADDON  2,263,805
STEERABLE LANDING GEAR
Filed Oct. 24, 1938  4 Sheets-Sheet 4

INVENTOR
Mathew C. Haddon

Patented Nov. 25, 1941

2,263,805

UNITED STATES PATENT OFFICE 2,263,805

STEERABLE LANDING GEAR

Mathew C. Haddon, Burlingame, Calif., assignor of one-half to George C. Sullivan, Los Angeles, Calif.

Application October 24, 1938, Serial No. 236,776

13 Claims. (Cl. 244—100)

This invention relates to aircraft, and more particularly to aircraft having a landing wheel or wheels which is or are desired to be steerable by the pilot or operator while in contact with a landing surface. The invention relates to certain new and useful improvements in aircraft, particularly airplanes, but not limited to such. The term "airplane" will be used throughout these specifications and claims to include broadly all types of aircraft. The nature and objects of the invention will be apparent to and readily understood by those skilled in the art in the light of the following explanation and detailed description of the accompanying drawings.

The newest airplane designs incorporate a front or nose landing wheel, and it is generally recognized that as airplanes become larger that a safe, simple and light and dependable method for steering the airplane and particularly the front or nose wheel will be desirable. It is my opinion that such a device or method will be required, and that it will also be desirable, if not required, that such method be connected and cooperated with the present airplane flight controls, thus eliminating the necessity of a separate control mechanism for steering the airplane while in contact with a landing surface.

It is to be understood that this device may be used for all types of airplanes having landing gears, and that such device may be applied to the main landing gear as well as the landing wheel. It is particularly adaptable in connection with airplanes having front or nose wheels, however, it is not to be limited to such as it is obvious that it is equally adaptable to steering any landing gear wheel including the conventional tail wheel. This device can be applied to a three ski landing gear, as it would be very advantageous and practical to steer either the front ski or the tail ski, inasmuch as brakes cannot be used to advantage in connection with ski gears. For convenience of terminology, the terms "landing wheel" and steerable "ground engaging member" will be used synonomously throughout these specifications and claims to include broadly all types of auxiliary gears, such as forward wheels, tail wheels, skis, hydroplane floats and water rudders. For the purpose of this specification, I shall describe and the drawings will portray the device united with the lateral control means of the airplane, in this case being ailerons, and incorporated in an airplane designed with a front or nose landing wheel. It is obvious that my invention may be applied to any flight control system and is not necessarily limited to the lateral control system. It is to be understood that when reference is made to aileron or ailerons, that such should be interpreted to include any type of device designed to give the necessary rolling moments for lateral control of the airplane. It is to be further understood that when reference is made to an aerodynamic control surface, that such should include any device producing equivalent results.

If the front wheel of an airplane with a three wheel landing gear is steerable, many benefits are obtained. These advantages include directional control during taxiing, take off run and roll after landing, as well as maneuvering in restricted airport and hangar facilities. It permits faster taxiing and maneuvering while on the ground, thus saving time. Dangerous obstructions can be quickly avoided.

Other advantages of my invention are that the lateral control system and the steerable wheel system is united and always connected to the pilot's control wheel or other flight controls so that there are no clutches, etc., to engage on landing or take off.

A further advantage is that steering by differential wheel brakes has been eliminated. This is particularly advantageous as on large ships the brakes wear out very rapidly when used for steering.

It is also known that in order to stop "shimmy" in the front wheel of this type of landing gear, that considerable damping torque is necessary. Further, it is known that as the load on the wheel increases, the amount of frictional resistance required to stop shimmy oscillations must be increased. It is present engineering practice to provide sufficient frictional or other damping torque as required by the normal load on the wheel, for if a larger frictional torque is used, the wheel is difficult to steer with the brakes. This device allows this torque to be designed for maximum load on the wheel, thus making for a better insurance against wheel shimmy, and yet not hindering the steering action. Therefore, it is apparent that my invention is advantageous in this respect.

In a small airplane (under 3000#) the non-retracting front wheel has been steered by connecting it through a system of levers and push pull tubes directly to the aileron or rudder controls of the airplane. This is not efficient or desirable in larger airplanes for when this is done, the maximum deflection of the flight control must produce the maximum deflection of the front wheel. Since both the force the pilot can conveniently apply and the movement of his controls are limited, the work into the system is limited, and this fact sets a practical limit to the weight of the airplane on which this elementary system of control can be used.

One of the many advantages and purposes of my invention is to provide a means of increasing the amount of work that can be put into the steering system by increasing the movement of the pilot's control. My previous attempts to achieve this have allowed the ailerons to deflect to their full deflection and then have provided a means of retaining them in that position while the pilot's control is moved an additional amount. Since such a method is complicated, unreliable and heavy, the ideas and principles disclosed by my invention are very novel and will permit a simple, reliable, light and inexpensive steering control which will be a great improvement in the art.

The usual danger due to the forces from the front wheel being greater than the pilot can overcome and thus loose control of the airplane, has been eliminated in my invention. The invention makes possible an easily operated control regardless of the weight of the airplane.

The invention consists in the novel parts and combination of parts to be disclosed hereafter, all of which contribute to produce an efficient means of steering airplanes. A preferred embodiment of the invention is described in the following specification and drawings, while the broad scope of the invention is pointed out in the appended claims.

The mode of operation of the entire device and invention will now be briefly stated.

In the drawings:

Figure 1 is a plan view of a conventional airplane showing the invention applied to a typical three wheel or "tricycle" landing gear. The forward portion of the body or fuselage is cut in section to illustrate the preferred location and general design of my invention. Only one wing and aileron is shown.

Figure 6 is a view illustrating a manner in which the landing wheel may be retracted, and showing a flexible system which will permit the landing wheel to be steerable in extended position and not steerable in retracted position. This simple method does not involve disconnecting the steering mechanism from the flight control mechanism thus insuring that the landing wheel, upon extension, will be in phase with the flight control mechanism.

Figure 1:
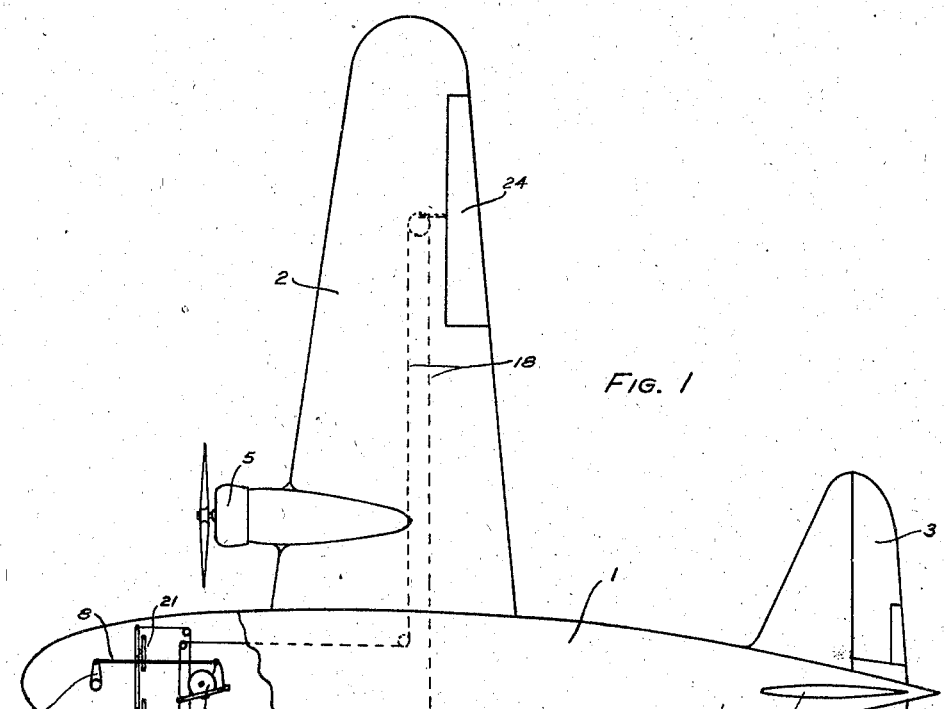
Figure 2:
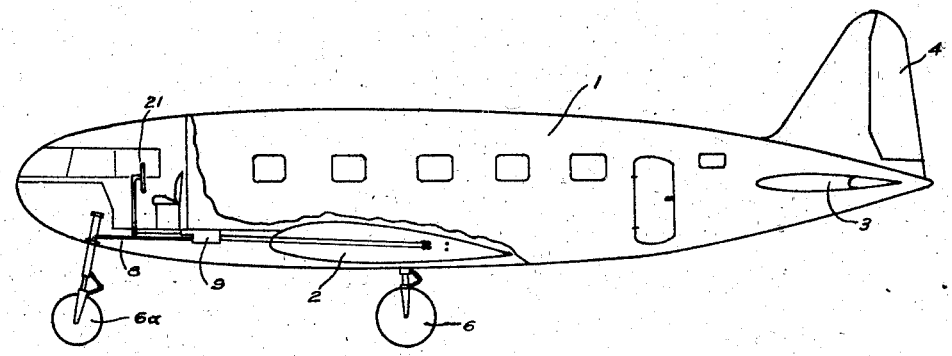
Figure 2 is a side view of the airplane, its forward portion also being cut to show in section the general aspect of my invention.
Figure 4:
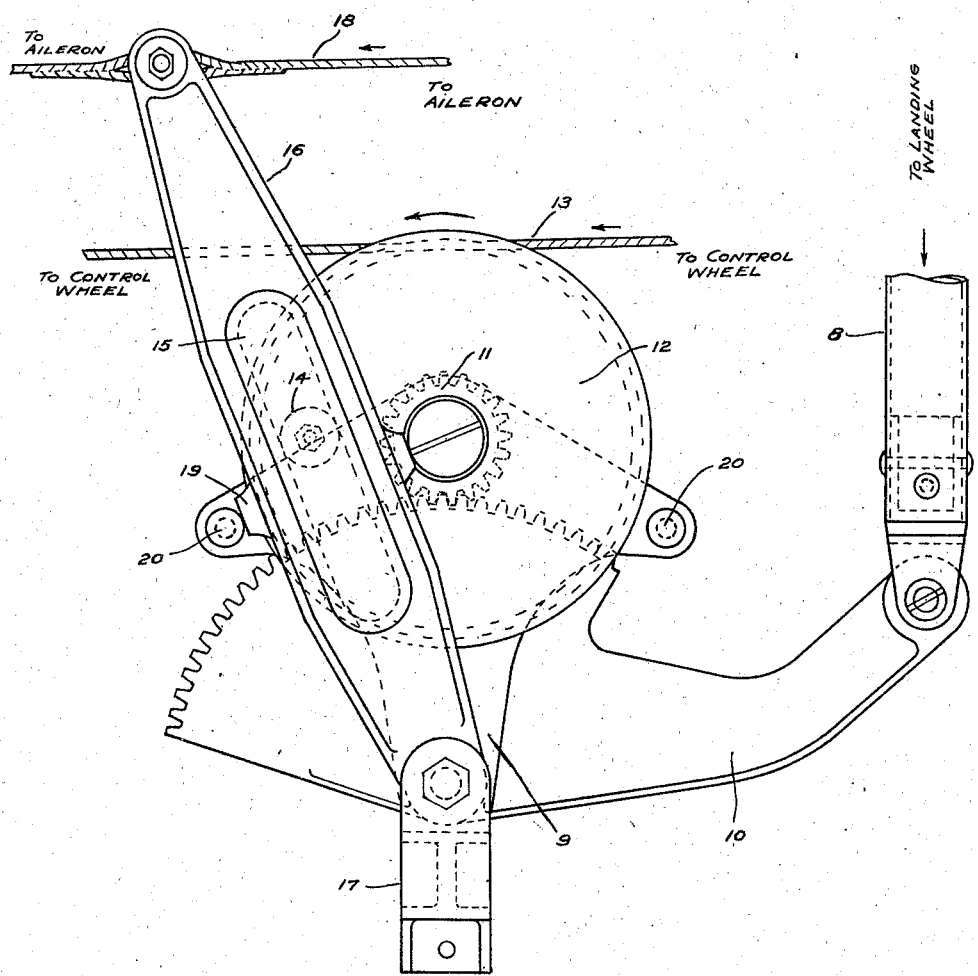
Figure 4 is a plan view of the mechanism which produces a means to combine the steering of the airplane while on a landing surface with the flight control system.
Figure 5:
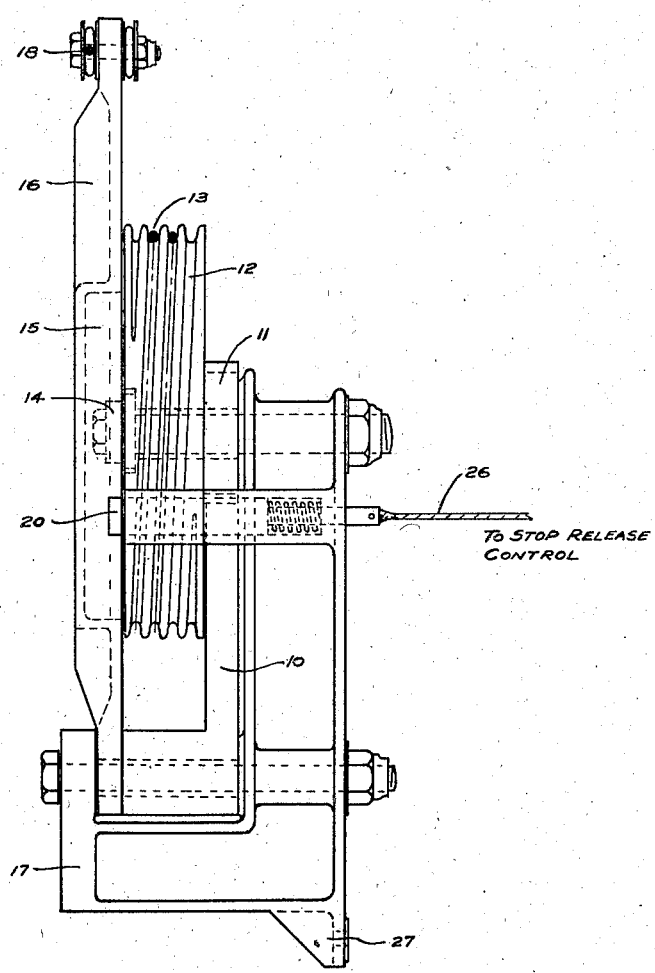
Figure 5 is an end view of this mechanism.

First, referring in particular to Figures 1 and 2 of the drawings, it is seen that the mechanism of Figures 4 and 5 have been incorporated in a conventional airplane, the latter having a body or fuselage 1, a main wing 2, a longitudinal control surface 3, a directional control surface 4, a propulsion means 5, a landing gear 6 and a forward nose landing wheel 6a. The combination of 6 and 6a is commonly known as a three-wheel or "tricycle" landing gear.

Figure 3:
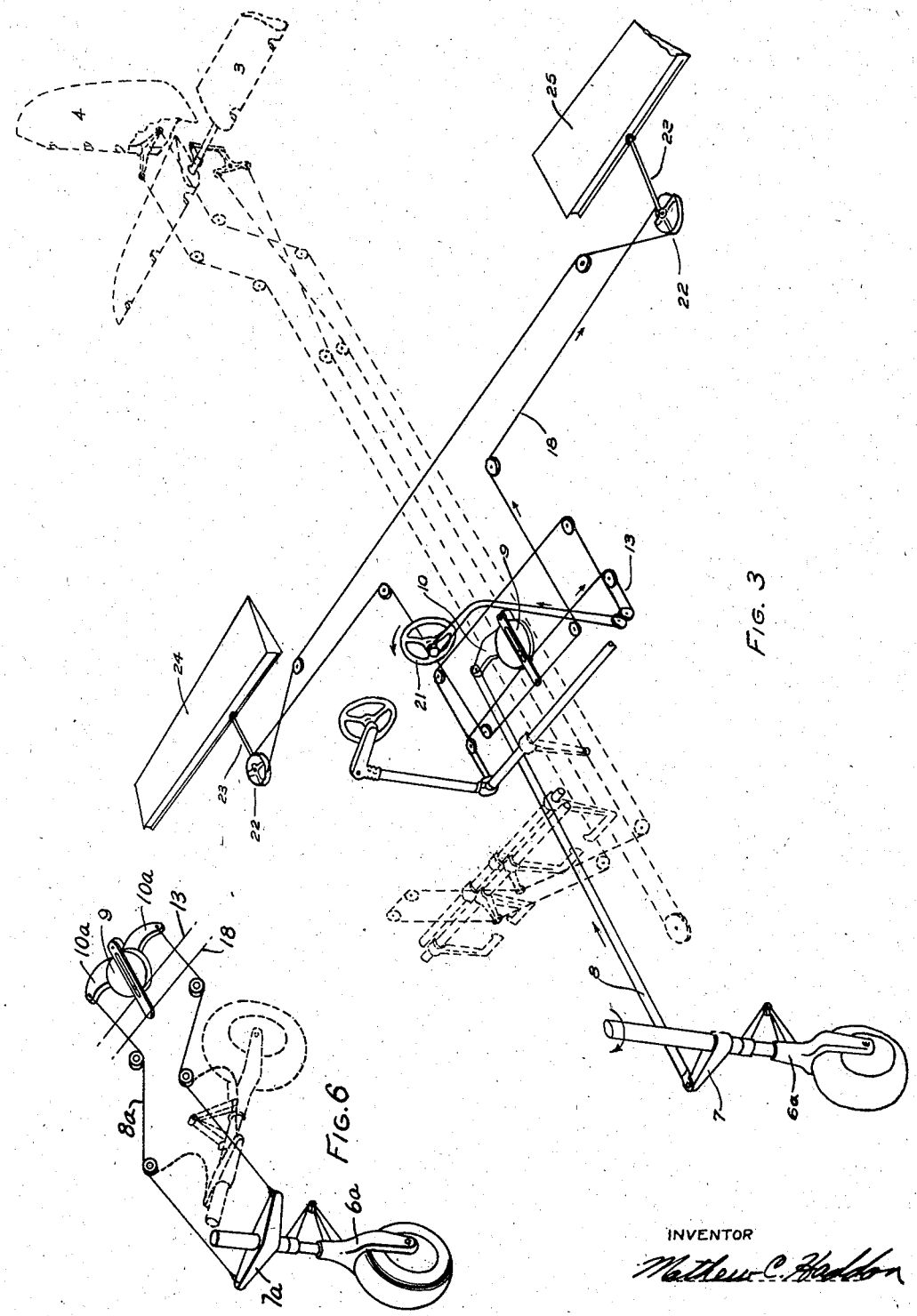
Figure 3 is a diagrammatical sketch of a typical airplane control system. My invention is illustrated in this figure by the heavy lines as being united with the lateral control means, the dotted lines showing the remaining control system necessary for airplane flight.

Referring to Figure 3, it is seen that the landing wheel and strut 6a is connected to the steering mechanism and airplane lateral control system by a mast 7 and a push pull tube 8. The tube 8 is connected to the steering and control mechanism assembly 9 by the steering arm and gear segment 10.

Referring to Figures 4 and 5, which illustrate the mechanism assembly 9, it is evident that the arm and gear segment 10 meshes with a pinion gear 11 which is attached to the cable drum 12. The lateral control system cable 13 is wrapped around the drum 12. An aileron control arm roller 14 is attached to the drum 12 and rides in a slot 15 of the aileron control arm 16, said control arm being pivoted on one end to the assembly frame 17 and attached at the other end to the aileron control cable 18. To prevent the arm 16 from reaching its dead center position while in flight, a stop 19 protrudes from arm 16 and an adjustable stop pin 20 is attached to the frame 17. Upon contact with the ground or landing surface the pin 20 is manually or automatically lowered thus releasing and allowing the arm 16 to freely travel according to its predetermined motion. The control cable 13 is attached by means of cable and pulleys to the pilot's control wheel 21. The aileron control cable 18 is also attached by means of cable and pulleys to a differential pulley 22 in the outer wing which actuates the push pull tube 23, which in turn actuates the ailerons 24 and 25, thus controlling the lateral motion of the airplane.

This invention is particularly adaptable to a landing wheel of the retractable type. In this event, it is obvious that the mast 7, the gear segment 10 and the push pull tube 8 can be replaced by a bellcrank 7a, a gear segment 10a and a cable-pulley system 8a which would be sufficiently flexible to allow for retraction and at the same time would be successfully operative in its extended position. This condition is illustrated by Figure 6. In this case, it would be advantageous, desirable and simple to have the stop pin 20 and its releasing cable 26 to be so adjusted that the pin 20 would be retracted automatically by the tension produced in the cable as the landing wheel extends to its landing position.

In order to summarize the operations and workings of my invention, I have shown on the drawings (particularly Figures 3 and 4) by arrows the action of the mechanism, which will be briefly explained as follows:

When the control wheel 21 is turned to the right, the cable system 13 is wrapped around the drum 12, which results in roller 14 moving arm 16 to the left. This operates cables 18 and causes differential pulley 22 to move the right aileron up. Likewise, the left aileron is moved down. This action continues until the arm 16 moves against the stop pin 20. However, when the airplane contacts or is in contact with the ground, cable 26 can be operated manually or automatically to retract pin 20 so that further movement of the control wheel 21 causes the aileron to deflect only a slight additional amount before arm 16 starts back towards neutral. Rotation of control wheel 21 causes rotation of drum 12 and of pinion 11 attached to it and of segment and arm 10 which rotates wheel 6a to the right about its steering axis, by means of linkage 7 and 8. Stops may be provided on 6a and/or 7 to prevent rotation beyond 45° each way from neutral.

The assembly 9 which may also be designated as a booster may be mounted by lug 27, and can be designed with various and different proportions, such as leverage arms and gear ratios, so as to produce any deflections desired, for any given number of turns of the control wheel and for any force desired to be applied to the control wheel.

It is to be understood that the embodiment of the invention as described herein is only one of the many embodiments that my invention may take, and I do not wish to be limited in practice to the invention, nor in the claims, to the particular embodiment set forth, but expect to be accorded the full scope and spirit of the invention as described in the specification and claims.

I claim:

1. In an aircraft, a steerable ground engaging member, an aerodynamic control surface, a control device, a means operatively connecting said control device to said surface and to said member for simultaneous operation thereof, said means including means for producing oscillating movement of said surface by operation of said control device to produce movement of said member in one direction.

2. An aircraft arrangement as defined in claim 1 in which said control device is manually operable.

3. In an airplane, an aerodynamic control surface, a steerable ground engaging member, a control device, and means operatively connecting the control device with the said surface and the said member, said means including a rotatable cable drum, a cable engaging said drum and connected to said control device, a pinion on said drum, a segment engaging said pinion and connected to said ground engaging member, a roller on the face of said drum, an arm pivotally mounted at one end and engaged by said roller at a medial portion thereof, a cable at the opposite end of said arm connected to said aerodynamic control surface, adapted to produce oscillating movement of said surface and a continuous movement of said member in one direction.

4. A combination as in claim 3 which includes a retractable stop adapted to limit the movement of said arm, and means to remove said stop.

5. In an aircraft, a retractable and steerable ground engaging member comprising an upper unit associated with said aircraft and a lower ground engaging unit associated with said upper unit, means for controlling the movement of the aircraft in flight, means responsive to the position of the ground engaging member to steer the aircraft on a landing surface, actuating means united with said flight controlling means and said steering means which increase in any desired ratio the work available for steering the aircraft on a landing surface over the work available for flight control.

6. In an aircraft, a retractable and extendable ground engaging member comprising an upper unit steerably associated with said aircraft and a lower ground engaging unit associated with said upper unit, an aerodynamic control surface, a control device, an actuating means operatively connecting said control device to said surface and to said member for simultaneous operation thereof, said actuating means including means to dampen torque oscillations of said ground engaging member and to make available more work to steer said member than is available to operate said surface, and additional means cooperating with said actuating means to render said member inoperative in its retracted position.

7. An aircraft including a body, a lifting means, a directionally fixed main landing gear and a steerable landing wheel, a control device, an aerodynamic surface to control the movement of the aircraft in flight, a steering mechanism to control the movement of the aircraft on a landing surface, an actuating means operatively connecting said control device to said surface and to said steering mechanism and landing wheel, said actuating means including means of increasing the work available for steering control over the work available for flight control by increasing the movement of the control device.

8. An aircraft including a body, a lifting means, a directionally fixed main landing gear, a retractable and extendable landing wheel steerably associated with said aircraft, a control device, an aerodynamic surface to control the movement of the aircraft in flight, an actuating means operatively connecting said control device to said surface and to said landing wheel, said actuating means including means of increasing the work available for steering control over the work available for flight control, and additional means cooperating with said actuating means to prevent steering of the ground engaging member in its retracted position.

9. In an aircraft, a steerable ground engaging member, an aerodynamic surface to control the movement of the aircraft in flight, a control device, a means directly mechanically connecting said control device to said surface and to said member for simultaneous operation thereof, said means being so constructed and arranged that the ratio of the work transmitted to said control surface to the work transmitted to said member is less than one.

10. In an aircraft, a steerable ground engaging member, an aerodynamic control surface to control the movement of the aircraft in flight, a control device, a means directly mechanically connecting said control device to said surface and to said member, said means being so constructed and arranged that the ratio of the work transmitted to said control surface to the work transmitted to said member is less than one, and including a means whereby action of the control device may be limited to operation of the control surface alone.

11. An aircraft including a body, a lifting means, a directionally fixed main landing gear and a steerable landing wheel, a control device, means for controlling the movement of the aircraft in flight, means to steer the aircraft on a landing surface, and actuating means operatively connecting said control device to said flight control means and to said steer means and landing wheel, arranged and constructed so as to increase the work available for steering control over the work available for flight control, said actuating means including means to dampen torque oscillations of said ground engaging member.

12. In an aircraft having a body, a lifting means, a directionally fixed main landing gear, a steerable ground engaging member, a control device, an aerodynamic surface to control the movement of the aircraft in flight, a steering mechanism to control the movement of the aircraft on a landing surface; a control mechanism having an actuating means operatively connecting said control device to said aerodynamic surface and to said steering mechanism and ground engaging member, said actuating means including means for increasing the work available for steering control over the work available for flight control and including a second means whereby the control device may singly operate the control surface or simultaneously operate the control surface and the ground engaging member.

13. In an aircraft, a body, a lifting means, a directionally fixed main landing gear, a retractable and steerable ground engaging member, a control device, an aerodynamic surface to control the movement of the aircraft in flight, a steering mechanism to control the movement of the aircraft on a landing surface, an actuating means operatively cononecting said control device to said aerodynamic surface and to said steering mechanism and ground engaging member, said actuating means including means of increasing the work available for steering control over the work available for flight control, and limiting means operatively associated with said actuating means and adapted to limit the movement of the control device, said limiting means being operable in response to the extension of the landing wheel whereby said landing wheel may be operated through a greater angular range than said control surface.

MATHEW C. HADDON.